(12) United States Patent
Fleischer et al.

(10) Patent No.: US 9,193,923 B2
(45) Date of Patent: Nov. 24, 2015

(54) ENTRAINED FLOW GASIFIER WITH INTEGRATED RADIATION COOLER

(75) Inventors: Thomas Fleischer, Freiberg (DE);
Frank Hannemann, Freiberg (DE);
Christian Reuther, Freiberg (DE);
Manfred Schingnitz, Freiberg (DE);
Ralph Schumann, Freiberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 780 days.

(21) Appl. No.: 13/386,934

(22) PCT Filed: Jun. 29, 2010

(86) PCT No.: PCT/EP2010/059204
§ 371 (c)(1),
(2), (4) Date: Jan. 25, 2012

(87) PCT Pub. No.: WO2011/012393
PCT Pub. Date: Feb. 3, 2011

(65) Prior Publication Data
US 2012/0117878 A1 May 17, 2012

(30) Foreign Application Priority Data

Jul. 30, 2009 (DE) .......................... 10 2009 035 300

(51) Int. Cl.
| | |
|---|---|
| *B01J 7/00* | (2006.01) |
| *C10J 3/52* | (2006.01) |
| *C10J 3/48* | (2006.01) |
| *C10J 3/76* | (2006.01) |

(Continued)

(52) U.S. Cl.
CPC ........ *C10J 3/526* (2013.01); *C10J 3/485* (2013.01); *C10J 3/76* (2013.01); *C10J 3/78* (2013.01); *C10J 3/82* (2013.01); *C10J 3/84* (2013.01); *C10K 1/08* (2013.01); *C10K 1/10* (2013.01); *C10K 1/101* (2013.01); *C10J 2200/09* (2013.01); *C10J 2300/1884* (2013.01); *C10J 2300/1892* (2013.01); *Y02E 20/16* (2013.01); *Y02E 20/18* (2013.01)

(58) Field of Classification Search
CPC .............. C10J 3/485; C10J 3/487; C10J 3/50; C10J 3/503; C10J 3/506; C10J 3/52; C10J 3/523; C10J 3/526; C10J 3/74; C10J 3/76; C10J 3/82; C10J 3/84; C10K 1/08
See application file for complete search history.

(56) References Cited

U.S. PATENT DOCUMENTS

| | | | |
|---|---|---|---|
| 2007/0051044 A1* | 3/2007 | Holle et al. ..................... | 48/210 |
| 2008/0005966 A1* | 1/2008 | Fischer et al. .................. | 48/210 |

(Continued)

FOREIGN PATENT DOCUMENTS

| | | |
|---|---|---|
| DE | 4230124 A1 | 3/1994 |
| DE | 102005041931 A1 | 3/2007 |

(Continued)

*Primary Examiner* — Imran Akram

(57) ABSTRACT

An entrained flow gasifier designed as a component for an Integrated Gasification Combined Cycle plant of optimized efficiency is provided. The raw gas initially flows through a waste heat unit designed as a radiation cooler and subsequently flows through a full water quench. This results in a higher ratio of steam in the raw gas, which decreases the medium-pressure steam supply before the water-gas shift and thus improves efficiency in IGCC plants with $CO_2$ separation.

3 Claims, 2 Drawing Sheets

(51) Int. Cl.

| | | |
|---|---|---|
| *C10J 3/78* | (2006.01) | |
| *C10J 3/82* | (2006.01) | |
| *C10J 3/84* | (2006.01) | |
| *C10K 1/08* | (2006.01) | |
| *C10K 1/10* | (2006.01) | |

(56) References Cited

U.S. PATENT DOCUMENTS

| | | |
|---|---|---|
| 2008/0041572 A1 | 2/2008 | Wessel et al. |
| 2008/0141588 A1* | 6/2008 | Kirchhubel et al. ............. 48/77 |
| 2008/0175769 A1 | 7/2008 | Goller et al. |
| 2009/0007487 A1* | 1/2009 | Kohler et al. .................... 48/72 |
| 2009/0029299 A1* | 1/2009 | Fischer et al. .................... 431/6 |
| 2009/0202403 A1* | 8/2009 | Jimenez-Huyke et al. ... 422/198 |

FOREIGN PATENT DOCUMENTS

| | | |
|---|---|---|
| EP | 0305047 A2 | 3/1989 |
| JP | 10036862 A | 2/1998 |
| JP | 2004231741 A | 8/2004 |

\* cited by examiner

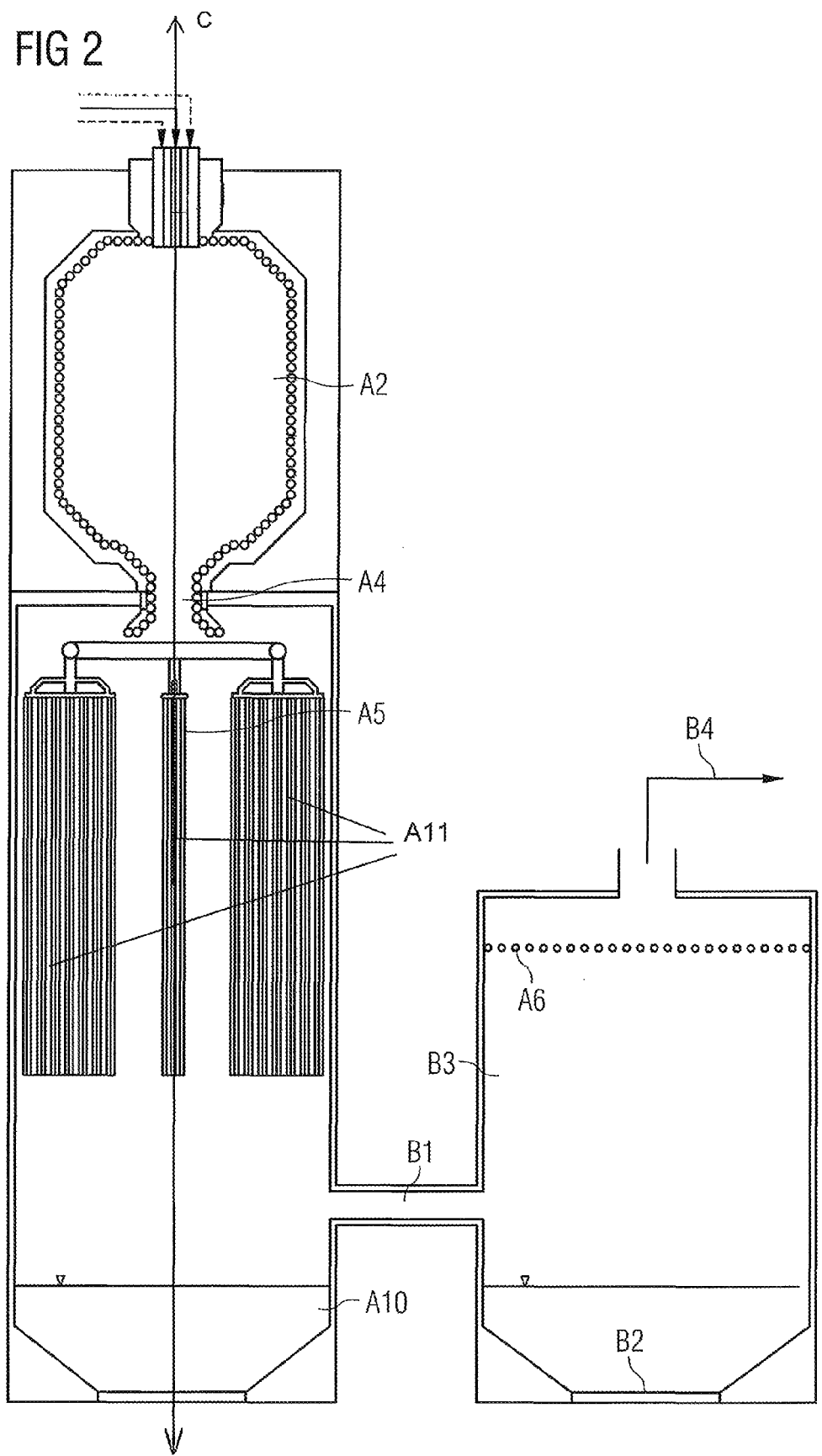

ENTRAINED FLOW GASIFIER WITH INTEGRATED RADIATION COOLER

CROSS REFERENCE TO RELATED APPLICATIONS

This application is the US National Stage of International Application No. PCT/EP2010/059204, filed Jun. 29, 2010 and claims the benefit thereof. The International Application claims the benefits of German application No. 10 2009 035 300.3 DE filed Jul. 30, 2009. All of the applications are incorporated by reference herein in their entirety.

FIELD OF INVENTION

The invention relates to an apparatus for using the sensible heat from raw gas generated in an entrained flow gasifier, in particular from the gasification of ash-forming fuels.

BACKGROUND OF INVENTION

In future, new requirements will be placed on fossil-fuel power plants, such as, for example, minimum emissions and additional $CO_2$ separation. Currently, the most advanced power plant concept for $CO_2$ separation is the Integrated Gasification Combined Cycle (IGCC). This technology encompasses gasification of the fuel before the actual combined cycle power plant (CCGT). Since $CO_2$ capture measures always entail a loss of efficiency (8%-12%, depending on the basic technical requirements), when implementing an IGCC plant it is important to attempt to achieve a high degree of efficiency for the individual subprocesses.

One possible process, which can be connected upstream of a CCGT power plant, is the Siemens Fuel Gasification process protected under the trademark 'SFG'. This autothermal entrained flow gasification process is suitable for using high-ash solid, liquid and gaseous feedstock. The feedstock is converted in a flame reaction, at temperatures (1500° C.-1800° C.) above the ash fusion temperature, into CO and $H_2$ (main synthesis gas components). The hot raw gas and the molten slag are discharged from the reactor into a quench section located directly beneath the reactor in which both the raw gas and the slag are cooled to about 200° C.-250° C. by means of full quenching. The granulated slag formed by the rapid cooling is collected in the quench section and sluiced out. The cooled gas is guided laterally out of the quench section and sent to the cleaning stages.

With a process concept with full quench, the high temperature level of the hot gasification gas cannot be used for the generation of steam.

The use of the sensible heat for steam generation is, for example, conceivable in an IGCC application with combined heat and power generation and, in this context, would represent a possibility for increasing efficiency.

In the case of a gasification process with partial quench, thermal energy can be rendered usable in a downstream heat recovery steam generator; however, partial quench is associated with a lower steam content of the raw gas than is the case with full quench.

SUMMARY OF INVENTION

The invention is based on the object of creating an entrained flow gasifier, which, as a component of an IGCC plant, optimizes its efficiency. In particular, the use of the sensible heat of the raw gas from steam generation is to be combined with steam saturation of the raw gas from full quench.

The object is achieved by an entrained flow gasifier with the features of the claims.

The invention entails a combination of an entrained flow gasifier with waste-heat steam generation.

The invention combines waste-heat utilization by means of a radiation cooler and a subsequent washing stage or free-space quenching.

The invention enables the use of the sensible heat of the hot raw gas and results in increased efficiency within an IGCC plant while retaining the high availability of an entrained flow gasifier with full quench.

The use of full quench after the waste heat unit results in a higher ratio of steam in the raw gas. In the case of IGCC concepts with $CO_2$ separation, this reduces the medium-pressure steam supply before the CO shift, which is advantageous with respect to efficiency.

The use of a washing stage after the waste heat unit enables precleaning and cooling of the raw gas. This greatly reduces the risk of caking due to tacky slag components in the downstream systems and hence increases the availability of the overall plant. The reduction of the raw-gas temperature to about 220° C. enables less expensive materials to be chosen for components between the pressure vessel reactor/quench section and the wet gas cleaning.

In the case of waste-heat utilization systems, which work below 700° C., there is a potential risk of alkali condensation in the waste heat unit. In the case of full quench, the alkali condensates are transferred directly into the washing water and hence downstream plants are protected from deposits.

An arrangement with a direct sequence of reaction chamber, slag removal body, waste heat unit and subsequent full quench has less complex control requirements than waste-heat utilization concepts such as, for example, partial quench with subsequent convective waste-heat utilization or a radiation cooler with subsequent partial quench. Hence, stable operation is ensured, even with high load variations.

A modular design facilitates the construction of the plant and the replacement of components in the event of repairs. The use of a washing stage in a container located next to the reactor/quench section has the advantage that the structural steel height is reduced. This reduces the investment costs for the gasifier compared to the first variant.

In addition, the counterflow guidance of the raw gas and washing water makes the washing process more efficient. Particles from the raw-gas flow are deposited in both the quench sump of the entrained flow gasifier and the water bath of the washing container, which achieves intensified cleaning of the raw gas.

The pressure-shell cooling of the radiation cooler and the quench section protects the pressure vessel from thermal stress and can also be used to produce steam, which is again favorable with respect to efficiency.

Advantageous developments of the invention are disclosed in the subclaims.

BRIEF DESCRIPTION OF THE DRAWINGS

The invention is explained in more detail in the following as an exemplary embodiment to the extent required for understanding with reference to the diagrams, which show.

In the diagrams, the same reference characters are used for the same elements.

DETAILED DESCRIPTION OF INVENTION

Figure 1:
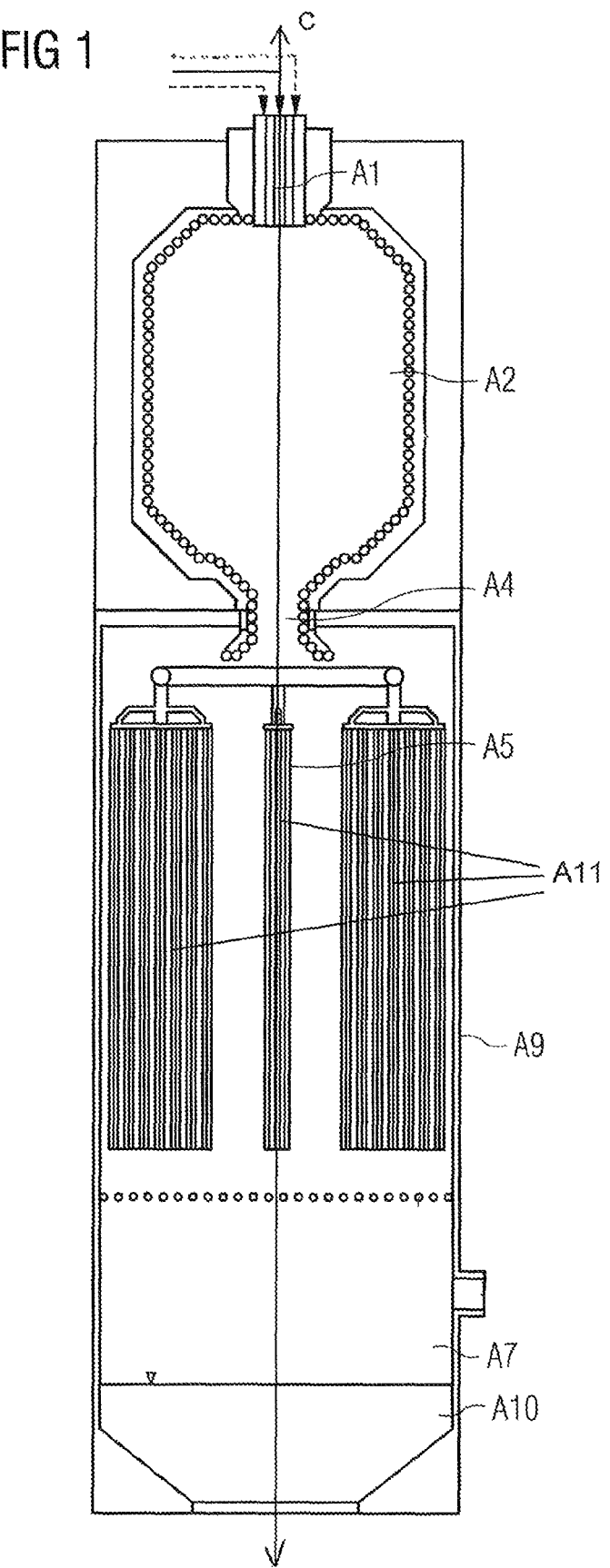
FIG. 1 a first variant of a gasification reactor according to the invention with a radiation cooler and full quench in a pressure vessel and FIG. 2 a second variant of a gasification reactor according to the invention with a radiation cooler and a separate washing container.

Two possible embodiments of the constructive and industrial implementation of the invention are disclosed.

Variant According to FIG. 1

The basic process concept according to the invention is explained with reference to FIG. 1.

The arrangement according to the invention comprises three main components:
the gasification reactor (A2)
the waste heat unit (A5)
the full quench system (A7)

The conversion of the ash-containing feedstock is performed in the gasification reactor (A2) in a flame reaction at temperatures above the ash fusion temperature. The hot raw gas and the molten slag flow out of the gasification reactor (A2) through the slag removal body (A4) into the waste heat unit (A5). The waste heat unit can be a radiation cooler. The radiation cooler is formed with a plurality of surface-area modules (A11), which are arranged with their narrow side at a prespecified distance from the central axis (C) of the entrained flow gasifier and with their main plane aligned radially to the central axis. The radii of the alignment of the surface-area modules (A11) have the same angles. In the exemplary embodiment, four surface-area modules (A11) are arranged with an angular offset of 90 degrees. The surface-area modules (A11) are supplied with a cooling liquid, which accepts the heat absorbed by the surface-area modules (A11). The cooling liquid can be supplied to/removed from the surface-area modules (A11) via a ring line. The distance of the surface-area modules (A11) from the central axis (C) keeps a cylindrical area free through which the slag can fall into the quench sump (A10).

In the waste heat unit (A5), the raw gas cools down from the gasification temperature to about 700° C. to 900° C. The quantity of heat removed from the entrained flow gasifier by means of the cooling liquid is used to produce steam, ideally high-pressure steam.

The raw gas is then exposed in the full quench system (A7) including a plurality of quenching nozzles (A6) or a washing stage to a suitably high quantity of water. The object of the quenching is to increase the ratio of steam until saturation of the raw gas is achieved. In the case of IGCC concepts with $CO_2$ separation, this improves efficiency since less medium-pressure steam has to be supplied before the CO shift. The quenching also represents a cleaning stage. Since the raw gas contains tacky fine particles, this washing is advantageous for protecting downstream systems from caking. In addition, alkalis and highly volatile heavy metals are transferred from the raw gas into the washing water. After the full quench system, the raw gas is further cleaned in order to conform to the purity specifications for the downstream plants. The residual quench water from the full quench system leaves the quench section sump and is fed through a pressure-relief section to the waste-water treatment system.

The liquid slag, which emerges from the gasification reactor, is cooled in the waste heat unit and in the full quench. The granulated slag drops into the quench section sump (A10) and is sluiced out via a slag discharge system.

In a particular embodiment variant, the reactor (A2), the waste heat unit (A5) and the full quench system (A7) are embodied as a pressure vessel. The advantage is that there is no need for building site installation.

In a particular embodiment variant, the gasification reactor and the waste heat unit (A5) with full quench are embodied as separate pressure vessels, which can be connected via a flange connection.

In order to protect the pressure shell from thermal stress, it can be equipped with a jacket cooling system (A9).

Variant According to FIG. 2

The embodiment according to FIG. 2 differs from the embodiment according to FIG. 1 in that the full quench is moved to a separate pressure vessel in which solids separation from the raw gas and saturation of the raw gas is achieved by means of a washer or another type of wet gas cleaning, for example a venturi.

The embodiment according to FIG. 2 leads to a reduction of the overall height of the steel framework and to the decoupling of the waste heat unit (A5) and full quench system (A7). This excludes the possibility of backflow from the full quench system (A7) into the waste heat unit (A5). The slag that forms is still collected in the quench section sump (A10) and discharged via a sluice system.

The raw gases are transferred via the connection B1 into the downstream washing unit (B3), including a plurality of quenching nozzles (A6). Here, raw gases, which are heavily loaded with solids, such as fly ash and extremely fine slag particles, are washed and the solids converted from the gas phase to the liquid phase by means of the washing water. The washing water is subjected to waste-water treatment and is removed (B2) from the downstream washing unit (B3). The cleaned water can be fed back into the washing process. The counterflow guidance of the washing water and raw gas shown in FIG. 2 is a favorable embodiment of the washing process.

In the case of raw gases with moderate dust loading, washing the raw gas is of subordinate significance. Here, the cooling of the raw gas is the central task. It is not then necessary to operate the washing unit (B3) by means of excess water, but is possible to dispense with steam saturation of the raw gas. Then, it is also possible to use other quenching media such as steam, water and steam mixtures, gases, water and gases, gases and steam and/or carbon-containing media.

Due to the high raw gas outlet (B4) temperature (>700° C.) at the radiation cooler, the transition piece between the reactor/radiation cooler and washing container can either be cooled or made of temperature-resistant materials (e.g. ceramic). The cooling can be ensured by both quenching (e.g. water/steam injection or gas) and/or additional cooling systems (e.g. a cooling coil or double tube). The dissipated heat can be used to produce steam.

The entrained flow gasifier and the flange-mounted washing container (B3) can be operated at a pressure of up to 8 MPa.

The invention claimed is:

1. An apparatus using heat from raw gas generated in an entrained flow gasifier, comprising:
    a gasification reactor connected via a slag removal body to a cooling chamber arranged therebelow along a central axis;
    a waste heat unit arranged in the cooling chamber arranged directly after the slag removal body;
    a quench sump located at the lower end of the cooling chamber; and
    a first raw gas outlet in a pressure shell bounding the cooling chamber arranged between the waste heat unit and the quench sump, wherein the waste heat unit is a radiation cooler, wherein the radiation cooler is embodied with a plurality of surface area planar modules arranged perpendicularly to the central axis, wherein the first raw gas outlet is connected to a separate washing container, the washing container comprising, an high-pressure enclosure, a plurality of quenching nozzles for spraying quenching water in the upper region of the washing container, a water bath at the lower end of the washing container, wherein the raw gas is supplied to the washing container between the surface of the water bath and mounting height of the quenching nozzles, and wherein a second raw gas outlet is arranged at the to of the washing container.

2. The apparatus as claimed in claim 1, wherein the pressure shell bounding the cooling chamber comprises pressure-shell cooling.

3. The apparatus as claimed in claim 1, wherein the high-pressure enclosure of the washing container comprises pressure-shell cooling.

* * * * *